(12) United States Patent
Wynblatt et al.

(10) Patent No.: US 6,871,318 B1
(45) Date of Patent: Mar. 22, 2005

(54) SYSTEM AND METHOD FOR AUTHORING, DISTRIBUTING AND REPLAYING DERIVATIVE HYPERMEDIA CONTENT

(75) Inventors: Michael Wynblatt, Robbinsville, NJ (US); Arturo Pizano, Belle Mead, NJ (US); Arding Hsu, Kendall Park, NJ (US); Daniel C. Benson, Seattle, WA (US); Chellury R. Sastry, Plainsboro, NJ (US); Vivek Agrawala, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/215,713

(22) Filed: Dec. 18, 1998

Related U.S. Application Data (63) Continuation-in-part of application No. 09/042,411, filed on Mar. 13, 1998, now Pat. No. 6,105,055.

(51) Int. Cl.[7] .............................................. G06F 17/00
(52) U.S. Cl. ................................ 715/500.1; 715/501.1; 715/512
(58) Field of Search .......................... 715/500.1, 501.1, 715/512, 513; 345/302, 760; 707/501.1, 512; 709/217–219

(56) References Cited

U.S. PATENT DOCUMENTS

| | | | | |
|---|---|---|---|---|
| 5,583,980 A | * | 12/1996 | Anderson | 345/473 |
| 5,809,247 A | * | 9/1998 | Richardson et al. | 709/218 |
| 5,822,539 A | * | 10/1998 | van Hoff | 709/203 |
| 5,838,313 A | * | 11/1998 | Hou et al. | 707/500.1 |
| 5,893,126 A | * | 4/1999 | Drews et al. | 345/781 |
| 6,006,265 A | * | 12/1999 | Rangan et al. | 709/226 |
| 6,009,429 A | * | 12/1999 | Greer et al. | 707/10 |
| 6,105,055 A | * | 8/2000 | Pizano et al. | 340/825.01 |
| 6,154,771 A | * | 11/2000 | Rangan et al. | 345/660 |
| 6,449,653 B2 | * | 9/2002 | Klemets et al. | 709/231 |
| 6,484,156 B1 | * | 11/2002 | Gupta et al. | 707/1 |
| 2001/0042098 A1 | * | 11/2001 | Gupta et al. | 709/206 |
| 2002/0002571 A1 | * | 1/2002 | Manohar et al. | 707/526 |
| 2002/0059342 A1 | * | 5/2002 | Gupta et al. | 707/512 |

* cited by examiner

*Primary Examiner*—Sanjiv Shah (57) ABSTRACT

A system for authoring, distributing, and replaying derivative hypermedia content comprises an authoring system for recording dynamic annotations and a distribution system for distributing the recorded dynamic annotations. The present system includes a playing system for playing the dynamic annotations which have been distributed. The system is applicable to the Internet or World-Wide Web (WWW) and/or to Intranet use.

39 Claims, 7 Drawing Sheets

SYSTEM AND METHOD FOR AUTHORING, DISTRIBUTING AND REPLAYING DERIVATIVE HYPERMEDIA CONTENT

CROSS-REFERENCE TO RELATED APPLICATION

The present application is a continuation-in-part of Ser. No. 09/042,411, now U.S. Pat. No. 6,105,055 entitled "METHOD AND APPARATUS FOR ASYNCHRONOUS MULTIMEDIA COLLABORATION" to Arturo Pizano, et al., filed on Mar. 13, 1998 and issued on Aug. 15, 2000.

BACKGROUND

The present invention relates to the field of information processing on a network such as the World Wide Web (WWW) and, more specifically, to authoring, distributing, and replaying derivative hypermedia content.

As the World Wide Web (WWW) becomes a more significant information source, there is an increasing need to share and reuse WWW information.

It is herein recognized as being desirable that a WWW user should be enabled to place annotations on WWW documents. There are prior art systems which allow certain kinds of annotations to be placed on WWW documents. The well-known Mosaic browser allows annotation of static text to a WWW document. However, this system has the limitation that the annotation was stored along with the document, and thus required the permission of the document owner to create an annotation. This prevented annotation on arbitrary pages as permission was typically not forthcoming, and it also resulted in security risks for the document owners who did grant permission. It also prevented users from having private annotations on a document.

Other systems, such as the ViewDirector Prism system, from TMS Sequoia, and the HotOffTheWeb system from Insight Development, allow graphical annotation on WWW documents. However, these annotations are static in nature, meaning that there is no timing or navigation information stored with them. Such a system cannot easily be used to author a tour through several pages as is herein recognized to be desirable. Moreover, these systems do not support voice annotation.

A natural mechanism for explanation or exposition is the so-called dynamic annotation, such as is described for image data in U.S. Pat. No. 5,838,313, issued 17-Nov.-1998 in the names of Hou, Tai-Yuan et al., whereof the disclosure is hereby incorporated by reference to the extent it is not inconsistent with the present application. Briefly, that application discloses a multimedia-based reporting system which utilizes a command interpreter to receive inputs from a user and forwards the inputs to an open report handler, a save report handler, a delete current report handler, a mail report handler, a static annotation handler, a dynamic annotation handler including a recording and playback handler, an annotation on annotation handler, an attach media handler and a print report handler. Most relevantly to the current invention, the dynamic annotation handler allows the individual to record/playback annotations from the user input.

Creating an annotation involves recording the mouse gestures, drawings, and voice of the annotation author, along with timing information, so that the annotation can be later replayed in just the way that the author created it. Unlike the Mosaic, Prism, and Sequoia systems mentioned above, users of a dynamic annotation system could see the graphical annotations unfold in time with the comments of the author.

SUMMARY

In accordance with an aspect of the present invention, there is described a tool which allows a WWW user to author a new kind of WWW content which is derivative from existing WWW documents. A user is able to add annotations to WWW documents, and record a "guided tour" through a series of WWW documents. The resulting tour is a combination of the existing WWW documents, the ordering and timing introduced by the author, and the author's annotations.

In accordance with another aspect of the invention, the idea of dynamic annotation is extended to also record navigation events. In this way, hypermedia documents can be toured in an annotation.

In accordance with an aspect of the present invention, there is described a multimedia based system for authoring, distributing, and replaying derivative hypermedia content, including a tool which, for example, allows a WWW user to author a new kind of WWW content which is derivative from existing WWW documents.

In accordance with another aspect of the invention, there are primarily three components to the system: an authoring system for recording dynamic annotations on hypermedia, a distribution system for distribution of those annotations, and a playing system for playing those annotations. The authoring and playing systems are comprised in a hypermedia browser, while the distribution system is partly comprised in the browser and partly in a special remote server. The part of the distribution system within the browser is called the annotation manager, and the remote server is called the annotation server.

The present invention, as hereinafter described by way of exemplary embodiments, integrates the idea of dynamic annotation with a hypermedia browser such as a WWW browser. A traditional hypermedia browser is augmented with systems for recording, distributing, and playing dynamic annotations of hypermedia documents. The invention generates new opportunities for creating and sharing derivative content from hypermedia sources such as the WWW.

BRIEF DESCRIPTION OF DRAWINGS

The invention will be more fully understood from the following detailed description of the preferred embodiments, in conjunction with the drawing, in which.

DETAILED DESCRIPTION OF PREFERRED EMBODIMENTS

As the most widely used form of hypermedia is the WWW, the invention will be illustratively described herein in terms of the WWW, although the concepts and general design are fully applicable to any hypermedia system.

Figure 1:
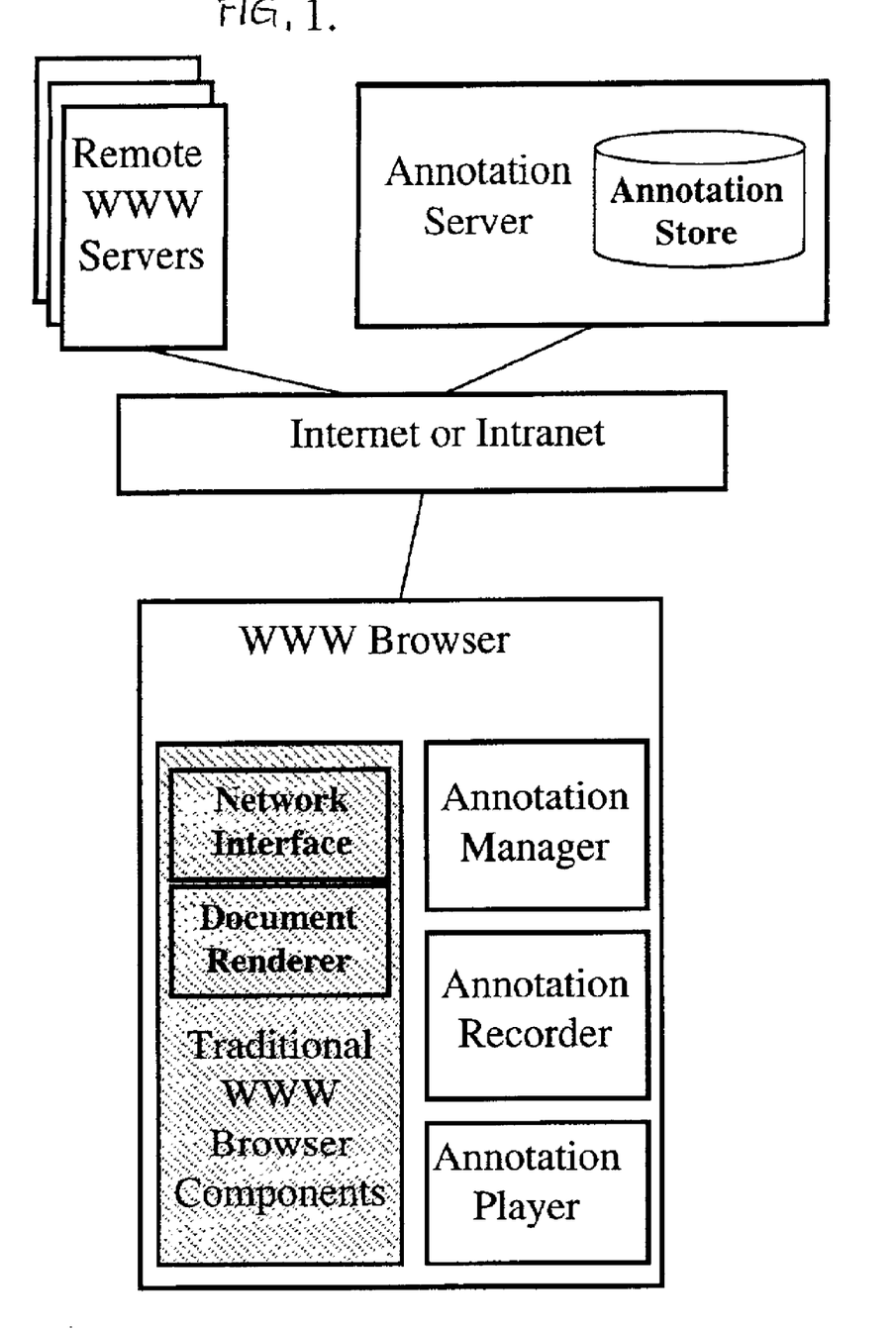
FIG. 1 shows the overall architecture of the system, as implemented for use with the WWW.

FIG. 1 shows the overall architecture of the system, as implemented for use with the WWW.

A traditional WWW browser has several components, notably a network interface which can access documents from remote sites on the network using well-known protocols such as HTTP, and a document renderer which converts structured documents into a form which is understandable by a user. These components are widely available for incorporation into extended systems, as for example from the FastNet ActiveX component set from NetMasters LLC. To allow the users to access the new features of the current invention, several new user-interface objects are added. Each of these objects is described with the relevant new component.

Figure 2:
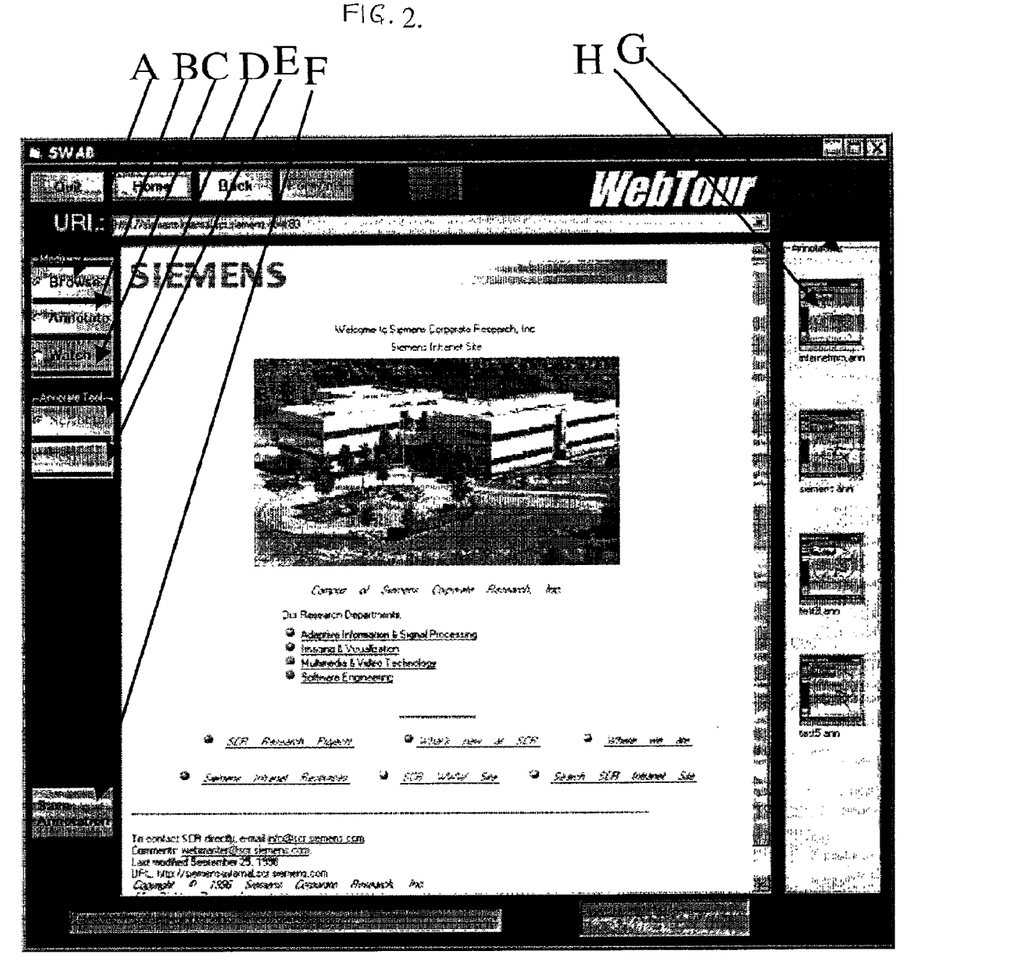
FIG. 2 shows a layout of an embodiment in accordance with the present invention.

FIG. 2 shows a layout of a typical instance of this invention, with the new user interface objects indicated.

The invention described in the afore-mentioned U.S. Pat. No. 5,838,313 allows the user to author dynamic annotations on electronic documents. The present invention allows the user to author annotations within a program for browsing hypermedia and furthermore exhibits three novel features: the capture and recording of navigation events, the capability to include multiple documents within an annotation, and the capability to insert hyperlinks to existing annotations.

On pages 8 and 9 of the afore-mentioned U.S. Pat. No. 5,838,313, a list is provided of "significant events" which are to be recorded in the annotation. Briefly, it is therein stated, in the context of events recorded during recording that two types of discrete events are included, the user-activated events and the time-sliced events. The user-activated events, of concern herein, have the format (event_name, time, parameters). Events were described therein for many typical user-activated events such as moving a user-interface object on the screen, changing the color of some text, erasing a graphic, etc.

In accordance with the described embodiment of the present invention, the list of significant events is extended to include the following navigation events, which are common in hypermedia browsers:

following a hyperlink invoking "forward", "back", "refresh", or "home" browser commands jumping to a document through the use of a history list jumping to a document by invoking a "bookmark"

scrolling the document in the viewable area.

As with other events described in the afore-mentioned U.S. Pat. No. 5,838,313, in accordance with the described embodiment of the present invention, each event is stored as (event_name, time, parameters). The first four navigation events are all stored with the event_name NEW_DOCUMENT, and with a single parameter that stores the target document ID. Normally, this ID uniquely identifies the document. In the case of WWW documents, the Universal Resource Locator (URL) serves as the ID. The scrolling events are stored as with the event name SCROLL and have one parameter to indicate the scrolling direction (left, right, up or down), and a second parameter to indicate the magnitude of the scroll.

Figure 4:
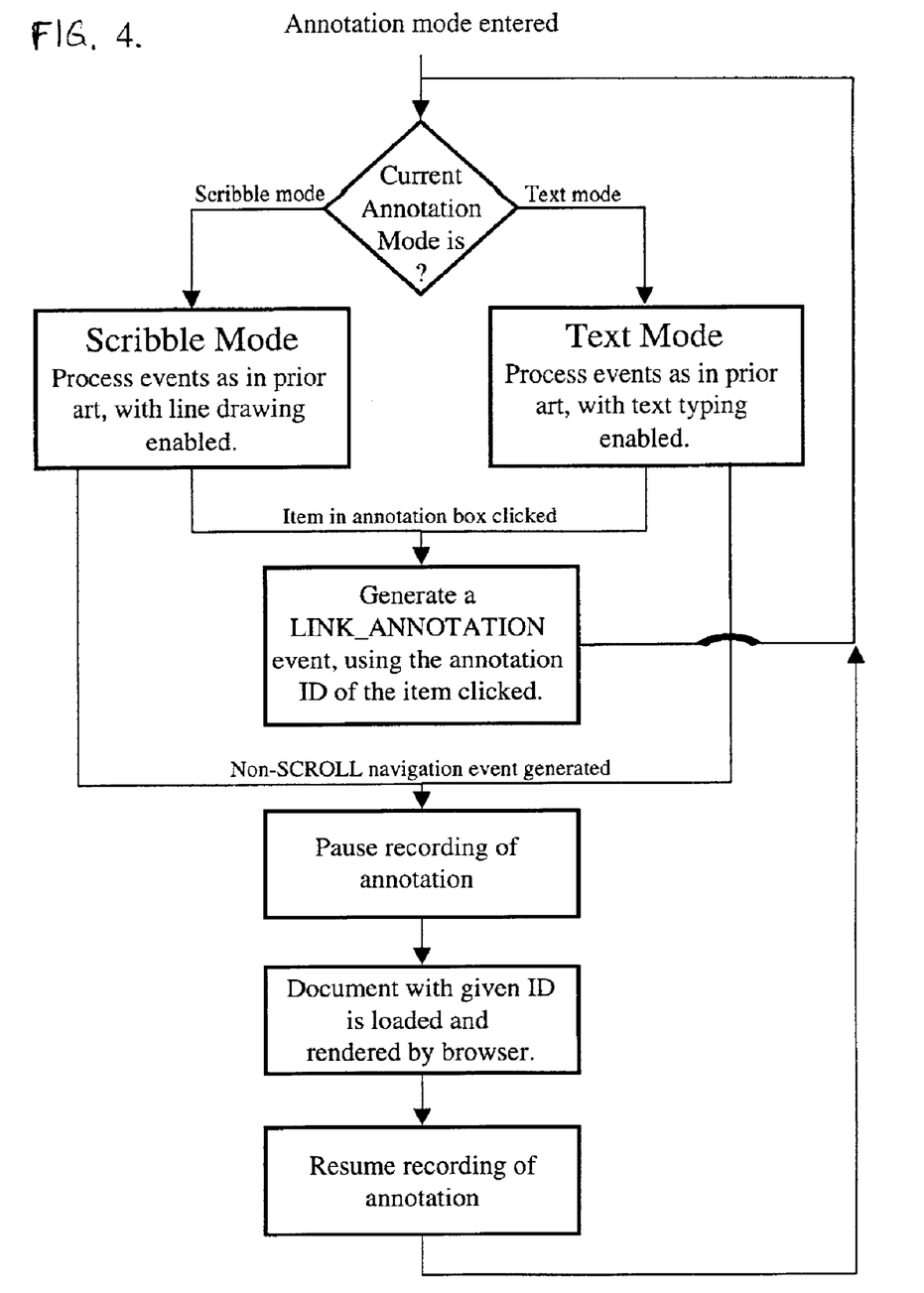
FIG. 4 shows the operation of the system in accordance with the present invention in annotation mode.

FIG. 4 shows the operation of the system in accordance with the present invention in annotation mode. During the authoring of an annotation, the occurrence of a navigation event other than a SCROLL event causes the hypermedia browser to load and render a new document in the usual way. The recording of the annotation, including the audio recording and the clock, pauses while the new document is loading, and resumes when the loading is completed. This allows multiple documents to be annotated within the same annotation. As the clock is paused during loading, times for all events are stored independent of the loading time of the various documents accessed. For example, if the user causes a MOUSE_MOVE event, the timestamp for this event would be the number of milliseconds since the annotation began, minus any time spent downloading.

Another novel feature of the dynamic annotation authoring component is the capability to create hyperlinks to existing annotations. The user creates a hyperlink by clicking on the target annotation identifier (marked H in FIG. 2) in the annotation manager box (marked G in FIG. 2) both of which are described in the next section. The hyperlink is stored as an event with event_name ANNOTATION_LINK, a time, and one parameter giving the identifier of the target annotation.

In order to allow the user to access the features of the dynamic annotation authoring system from within the hypermedia browser, two user-interface objects were added to the traditional browser interface. These are:

a browser-mode box with three buttons: browse, annotate and watch (A, B, and C in FIG. 2)

an annotation-mode box with two buttons: scribble and text (D and E in FIG. 2).

Figure 3:
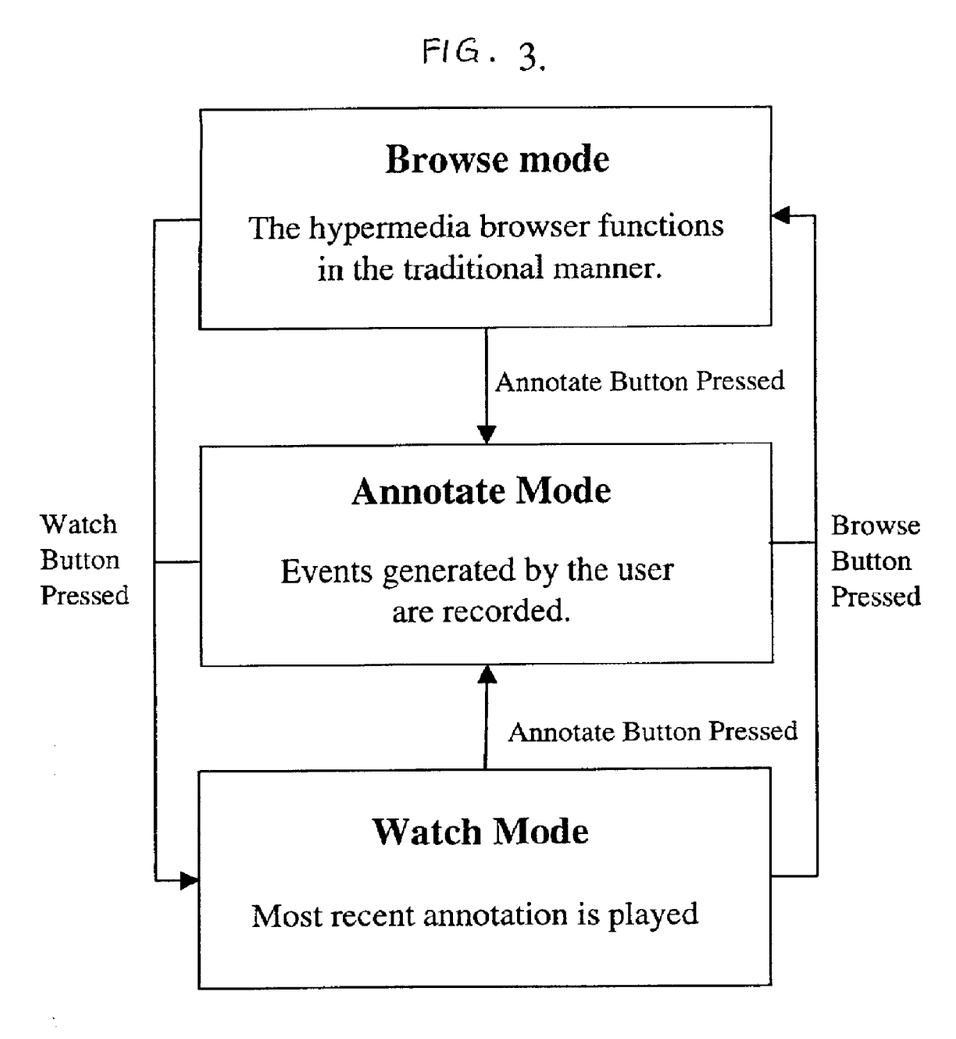
FIG. 3 shows the flow of control of a hypermedia browser in accordance with the present invention.

A mode box is a collection of options, only one of which can be valid at a time. FIG. 3 shows the flow of control of the hypermedia browser as determined by the two new mode boxes. The browser-mode is normally Browse, in which case the annotation-mode box is disabled (shown). In Browse mode, the normal WWW operations are in effect. Clicking on the annotate button switches the browser-mode to Annotate. In this mode (see FIG. 4), events (including the navigation events listed in the previous section) are captured and stored as in the afore-mentioned U.S. Pat. No. 5,838,313, depending on the annotation-mode. The annotation-mode box is enabled. Clicking on the text button sets the annotation mode to Text, and clicking on the scribble button sets the annotation-mode to Scribble. In both annotation-modes, mouse events are captured. In the Scribble mode, MOUSE_MOVE events following a MOUSE_DOWN event, but preceding the next MOUSE_UP event cause a line to be drawn.

In Text mode, no lines are drawn, and MOUSE_DOWN events are used to fix the X,Y coordinates for TYPE events. The first TYPE event receives the X,Y coordinates of the last MOUSE_DOWN event, and successive TYPE events receive the same Y coordinate and an incremented X coordinate appropriate for the font size.

As shown in FIG. 3, clicking on the browse button returns the browser to Browse mode, and ends the annotation. Clicking on the watch button switches the browser to Watch mode in which the current annotation is replayed, as described in section "A Means for Playing Dynamic Annotations of Hypermedia."

A second principal component of the invention is a system for distributing annotations. This system includes elements within the hypermedia browser, called the annotation manager, and elements at a remote server, called the annotation server. In general, the system allows the user to store annotations at the annotation server. When another user accesses the same hypermedia document, the browser checks the server for any annotations on that document. If there are, these annotations are made available to the new user for viewing.

In order to allow the user to access the features of the dynamic annotation distribution system from within the hypermedia browser two user-interface objects were added to the traditional browser interface:

a save button (labeled F in FIG. 2)
an annotation manager box (labeled G in FIG. 2), which contains annotation identifiers (labeled H in FIG. 2).

Figure 5:
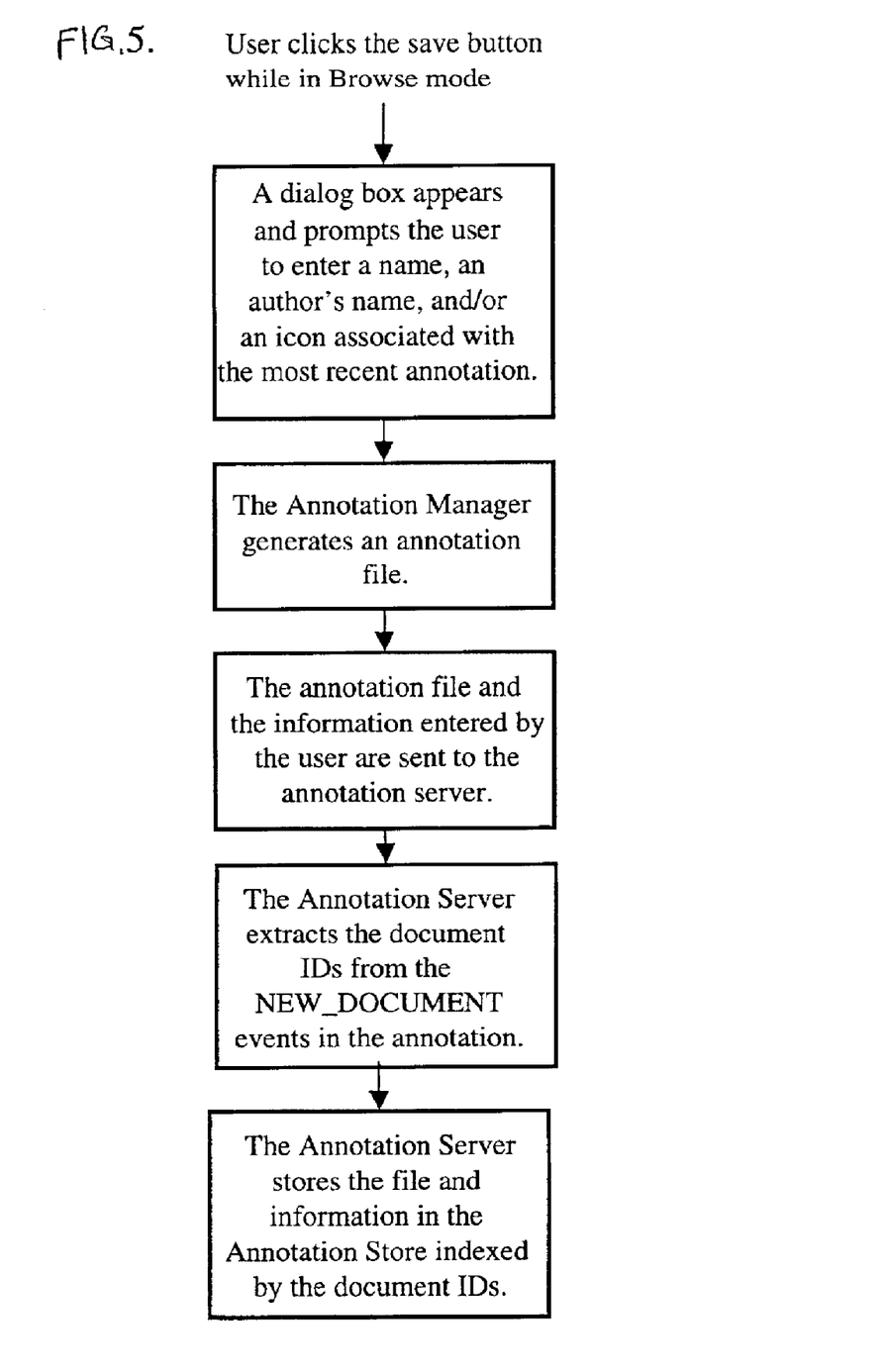
FIG. 5, in reference to a system in accordance with the invention, shows the operation of the annotation distribution system for the storing of an annotation.

After having authored an annotation and having returned to Browse mode, the user has the option of storing it on the annotation server. User interface element F is the save button. As shown in FIG. 5, pressing the save button invokes a dialog box of the traditional kind, which allows the user to enter a name for the annotation and their own name. Once a name is entered, the annotation is written to the local disk as an annotation file, as described in the afore-mentioned U.S. Pat. No. 5,838,313. The file is then transferred to the annotation server through the use of FTP or a comparable file transfer protocol, along with its name and/or the name of the author. An optional feature is that the annotation manager generates a visual icon representing the annotation, and sends that to the annotation server as well.

At the annotation server, the annotation file is stored in the annotation store. The annotation store can be any kind of traditional database. The annotation file entry is indexed by the unique ID of each document included within the annotation. These IDs can be extracted directly from the NEW_DOCUMENT events in the annotation file.

Figure 6:
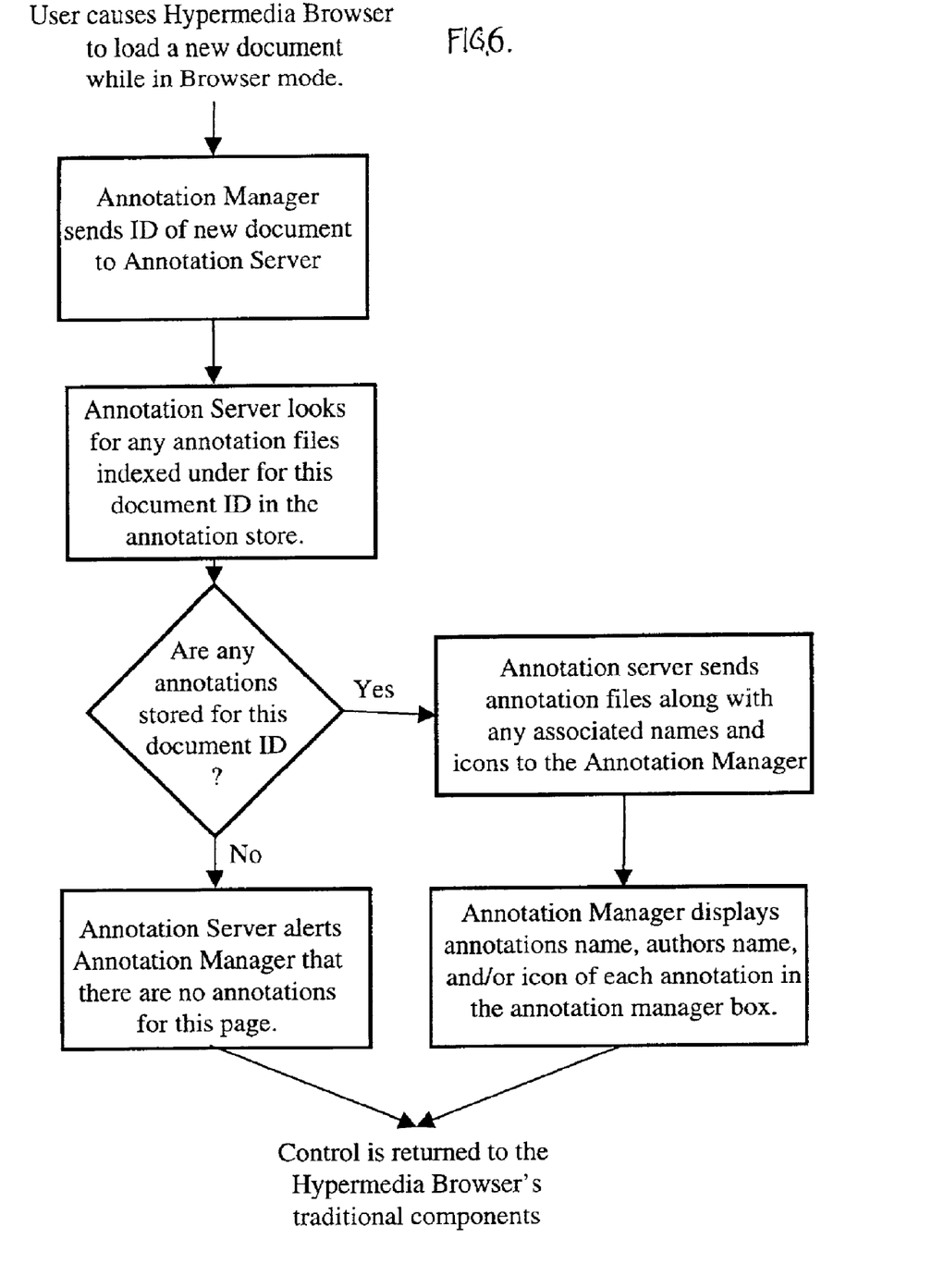
FIG. 6, in reference to a system in accordance with the invention, shows the operation of the annotation distribution system for the alerting users of the presence of annotations.

As shown in FIG. 6, each time a user accesses a document using the hypermedia browser, the annotation manager queries the annotation server using the ID of the document. If any annotations are stored in the annotation store which have been indexed with that ID, the names of these annotations, their authors, and their icons if available, are returned to the annotation manager. These names and icons are then displayed to the user in the annotation manager box, which is user interface element G, each separately, as shown in user interface element H. The user is thus made aware of any annotations which may be available for this document.

There are many protocols for restricting a user's rights to viewing annotations, each of which may be useful in different situations. Such protocols and will not be particularly described herein, in that the present invention is compatible with a number of possible choices of access protocol.

While the invention disclosed in the afore-mentioned U.S. Pat. No. 5,838,313 allows the user to play dynamic annotations on electronic documents; the present invention enables the playing of annotations within a program for browsing hypermedia, and extends operation with three new features: the capability to play annotations over multiple documents, an enhanced synchronization system to handle arbitrary document loading times, and a means for displaying temporal hyperlinks to other annotations.

Figure 7:
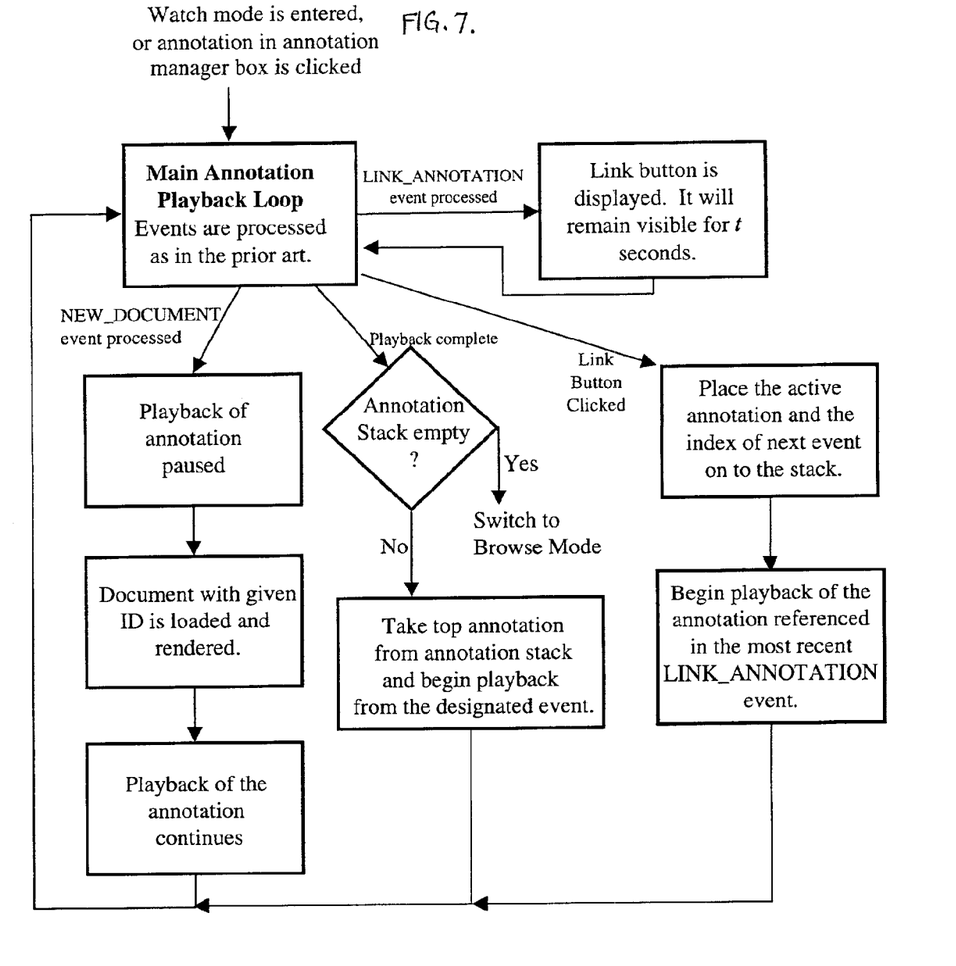
FIG. 7 shows the operation of the system in accordance with the present invention, during annotation playback.

The user of the system can play previously recorded annotations by clicking on any of the annotations listed in the annotation manager box described previously. In addition, an annotation author can view the annotation he has just made by switching the browser into Watch mode, as shown in FIG. 3. The operation of the system during playback is shown in FIG. 7.

As described in the afore-mentioned U.S. Pat. No. 5,838,313, annotations are played by processing each event that has been stored, in turn, while maintaining the timing as much as possible. In the case of NEW_DOCUMENT events, the ID of the document is passed to the traditional browser modules for loading and rendering. Any subsequent events, such as drawing of lines or mouse gestures, are displayed on the new document. In this way, annotations over multiple documents can be played.

A difficulty posed by multiple-document annotation, as opposed to single document annotation, is that the time required to load and render a new document is not consistent from recording to playback, or even from one playback to another. This is particularly true with WWW documents, for which the loading time can vary substantially. At playback time, this can cause the recorded audio and events, which are on an absolute timeline, to become unsynchronized with the associated document. In the present invention, this problem is solved by pausing both the recording and playback of annotations during the loading and rendering of new documents. Specifically, when a NEW_DOCUMENT event is processed in Watch mode, playback is paused until the browser notifies the playback module that loading and rendering are complete. Further, the timestamps of all events are stored and interpreted relative to the completion of the loading of the most recent document. In this way, arbitrary loading times can be tolerated with no loss of synchronization.

As described previously, the present invention allows annotation authors to create hyperlinks to existing annotations. These are stored as ANNOTATION_LINK events. During playback, ANNOTATION_LINK events are interpreted by causing a special "link button" to appear on the browser temporarily. In the described exemplary embodiment, the link button appears initially bright red, and then slowly fades to white over a period of t seconds. Empirical tests show that five seconds is an appropriate value for t. After the link button becomes completely white, it is removed. While the link button is visible, the user may click on it. Clicking on the link causes the playback of the current annotation to pause, and playing to begin of the target annotation, that is, the annotation with the ID stored in the ANNOTATION_LINK event. When the target annotation concludes, the playback of the previous annotation resumes at the event where it left off.

As there may be several annotation hyperlinks followed during a single playback session, a stack is required to maintain the state of the playback. Whenever the link button is clicked, the current annotation, and the index of the next event in the annotation, are placed on the stack. Whenever an annotation concludes, the stack is checked to see if there are any outstanding annotations to resume. If the stack is empty, the playback is finished; otherwise the annotation on the top of the stack is removed, and playback resumes with that annotation.

While the invention has been described by way of exemplary embodiments, it will be understood by one of skill in the art to which it pertains that various changes and modifications may be made to the invention without departing from the spirit of the invention and that such changes and modifications are intended to be covered by the claims following.

What is claimed is:

1. A system for authoring, distributing, and replaying derivative hypermedia content, said system comprising:
    an authoring system for recording dynamic annotations on any of a plurality of hypermedia documents for subsequent synchronized playback;
    a distribution system for distributing said dynamic annotations which have been recorded by the authoring system; and
    a playing system for playing said dynamic annotations that have been distributed by the distribution system, said playing system enabling loading of multiple ones of said hypermedia documents each comprising at least one of said annotations while maintaining synchronized playback of said at least one annotation in ones of said hypermedia documents with said at least one annotation in others of said hypermedia documents.

2. A system for authoring, distributing, and replaying derivative hypermedia content in accordance with claim 1, wherein said authoring system for recording dynamic annotations comprises:
    a system for capturing navigation events.

3. A system for authoring, distributing, and replaying derivative hypermedia content in accordance with claim 2, wherein said playing system for playing said dynamic annotations comprises:
    a system for playing said navigation events.

4. A system for authoring, distributing, and replaying derivative hypermedia content in accordance with claim 1, wherein said dynamic annotations are recorded on hypermedia.

5. A system for authoring, distributing, and replaying derivative hypermedia content in accordance with claim 4, wherein hyperlinks may be created and followed between said dynamic annotations.

6. A system for authoring, distributing, and replaying derivative hypermedia content in accordance with claim 5, including a hypermedia browser, said authoring and playing systems being included in said hypermedia browser and said distribution system being in part comprised in said hypermedia browser.

7. A system for authoring, distributing, and replaying derivative hypermedia content in accordance with claim 6, including a remote annotation server.

8. A system for authoring, distributing, and replaying derivative hypermedia content in accordance with claim 7, wherein said distribution system is partly comprised within said hypermedia browser and partly within said remote annotation server.

9. A system for authoring, distributing, and replaying derivative hypermedia content in accordance with claim 8, wherein said remote annotation server further comprises an annotation store, and a mechanism for indexing, retrieving and transferring annotation files.

10. A system in accordance with claim 1, including:
    means for defining hyperlinks between dynamic annotations, said means for defining hyperlinks requiring only peripheral involvement by a user for specifying them, said means for defining hyperlinks during playback displaying hyperlinks in an appropriate temporal context, and allowing arbitrary nesting of hyperlink invocations.

11. A system as defined in claim 1 wherein:
    said dynamic annotations comprise a recorded sequence of user events and media data, in the context of a particular hypermedia document, synchronized to a time stream;
    said user events comprise navigation events, mouse operations, and keystrokes made by the user; and
    said media data comprises at least one of an audio and video recording made by the user.

12. A system, for use with at least one of a communications web and a net, said net optionally comprising at least one of the Internet and an intranet, said system being for authoring, distributing, and replaying derivative hypermedia content, said system comprising:
    an annotation server for being coupled to said at least one of a communications web and a net;
    a remote net server for being coupled to said at least one of a communications web and a net;
    a net browser for being coupled to said at least one of a communications web and a net;
    an authoring system for recording dynamic annotations on any of a plurality of hypermedia documents for subsequent synchronized playback;
    a distribution system for distributing said dynamic annotations which have been recorded by the authoring system; and
    a playing system for playing said dynamic annotations that have been distributed by the distribution system, said playing system enabling loading of multiple ones of said hypermedia documents upon each of which at least one of said annotations was made while maintaining synchronized playback of said at least one annotation in ones of said hypermedia documents with said at least one annotation in others of said hypermedia documents.

13. A system in accordance with claim 12, wherein said net browser comprises:
    a system for capturing navigation events.

14. A system in accordance with claim 13, wherein said annotation server comprises an annotation store.

15. A system in accordance with claim 12, in which hyperlinks may be created and followed between annotations.

16. A system in accordance with claim 15, wherein said net browser comprises traditional hypermedia browser components, an annotation manager, an annotation recorder, and an annotation player.

17. A system in accordance with claim 12, wherein said system has a selectable Browse operating mode wherein said net browser functions in a traditional hypermedia browser manner, an Annotate mode wherein events generated by a user are recorded, and a Watch mode wherein a most recent annotation is played.

18. A system in accordance with claim 12, wherein said system displays available annotations for each document that a user visits.

19. A system in accordance with claim 12, including:
   means for defining hyperlinks between dynamic annotations, said means for defining hyperlinks requiring only peripheral involvement by a user for specifying them, said means for defining hyperlinks during playback displaying hyperlinks in an appropriate temporal context, and allowing arbitrary nesting of hyperlink invocations.

20. A system as defined in claim 12 wherein:
   said dynamic annotations comprise a recorded sequence of user events and media data, in the context of a particular hypermedia document, synchronized to a time stream;
   said user events comprise navigation events, mouse operations, and keystrokes made by the user; and
   said media data comprises at least one of an audio and video recording made by the user.

21. A method for use with at least one of a communications web and a net for authoring, distributing, and replaying derivative hypermedia content, said net optionally comprising at least one of the Internet and an intranet, said method comprising the steps of:
   recording a dynamic annotations on any of a plurality of hypermedia documents;
   distributing said dynamic annotations that have been recorded;
   playing said dynamic annotations that have been distributed and enabling loading of multiple ones of said hypermedia documents upon which at least one of said annotations was made while maintaining synchronized playback of said at least one annotation;
   coupling each of at least one remote server, an annotation server, an annotation manager, and a net browser to said at least one of a communications web and a net; and
   selecting one of a Browse mode, an Annotate mode, and a Watch mode for respectively causing said net browser to function in a traditional hypermedia browser manner, causing events generated by a user to be recorded, and for causing a most recent annotation to be displayed.

22. A method in accordance with claim 21, wherein said causing events generated by a user to be recorded includes causing navigation events to be recorded.

23. A method in accordance with claim 21, wherein said causing a most recent annotation to be displayed includes causing navigation events to be displayed.

24. A method in accordance with claim 21, wherein said Browse mode, said Annotate mode, and said Watch mode are selectable by screen button functions.

25. A method in accordance with claim 21, comprising the steps of, when said Annotate mode is selected for recording events:
   selecting one of a drawing mode and a typing mode.

26. A method in accordance with claim 21, comprising the step of, upon selection of an icon or text representing an annotation and having an annotation ID:
   generating a link annotation event using said annotation ID of said item selected.

27. A method in accordance with claim 21, comprising the steps of, when said Annotate mode is selected for recording events, and upon one of (a) selection of an item in an Annotation box, and (b) generation of a non-scroll navigation event:
   pausing recording of annotation;
   loading a document with given ID;
   rendering said document by said net browser; and
   resuming recording of annotation.

28. A method in accordance with claim 27, comprising the steps of, when said Browse mode is selected and upon execution of a non-scroll navigation event which causes a new document to be loaded by the browser:
   said Annotation manager sending an ID of said new document to said Annotation server; upon said Annotation server finding any annotations stored for said ID of a new document, said Annotation server sending annotation files along with any associated names and icons to said Annotation Manager, said Annotation Manager displaying annotation's name, author's name if any, and icon if any, of each annotation in an Annotation Manager box.

29. A method in accordance with claim 28, comprising the steps of, when said Browse mode is selected, and upon execution of a non-scroll navigation event which causes a new document to be loaded by the browser:
   said Annotation manager sending an ID of a new document to said Annotation server;
   upon said Annotation server finding no annotations stored for said ID of a new document, said Annotation alerting said Annotation Manager that there are no annotations for a current page.

30. A method in accordance with claim 21, comprising the steps of, when said Browse mode is selected and upon activation of a save function:
   entering information including a user-selected name associated with a most recent annotation;
   generating an annotation file;
   sending said name and said annotation file to said annotation server;
   extracting document ID's from NEW_DOCUMENT events in said annotation; and
   storing a file with said information in an Annotation Store indexed by said document ID's.

31. A method in accordance with claim 21, comprising the steps of, when said Watch mode is selected:
   processing events in a traditional manner in a Main Annotation Playback Loop.

32. A method in accordance with claim 31, comprising the steps of, when said Watch mode is selected, and upon processing of a non-scroll navigation event,
   pausing playback of annotation;
   loading a document having a selected ID;
   rendering said document; and
   continuing playback of said annotation.

33. A method in accordance with claim 32, comprising the steps of:

if said playback is complete, verifying whether an Annotation Stack is empty and, if so, switching to said Browse mode and, if not, taking the top annotation from said stack and beginning playback from the designated event.

34. A method in accordance with claim 33, comprising the steps of, when said Watch mode is selected, and upon processing of a link annotation event, creating a temporary Link Button which remains available to the user for a pre-determined length of time.

35. A method in accordance with claim 34, comprising the steps of, when said Watch mode is selected, and upon activating said Link Button, placing the ID of the active annotation, along with the index of the next event in the active annotation on the top of the stack;

beginning playback of an annotation referenced in the most recent link annotation event.

36. A method in accordance with claim 35, comprising the steps of:

if said playback is complete, verifying whether an Annotation Stack is empty and, if so, switching to said Browse mode and, if not, taking a top annotation from said stack and beginning playback from a designated event.

37. A method as defined in claim 21 wherein:

said recorded dynamic annotations comprise a recorded sequence of user events and media data, in the context of a particular hypermedia document, synchronized to a time stream;

said user events comprise navigation events, mouse operations, and keystrokes made by the user; and said media data comprises at least one of an audio and video recording made by the user.

38. A method for authoring, distributing, and replaying derivative hypermedia content, said method comprising the steps of:

recording dynamic annotations on any of a plurality of hypermedia documents for subsequent synchronized playback;

distributing said dynamic annotations which have been recorded; and playing said dynamic annotations that have been distributed and enabling loading of multiple ones of said hypermedia documents upon each of which at least one of said annotations was made while maintaining synchronized playback of said at least one annotation in ones of said hypermedia documents with said at least one annotation in others of said hypermedia documents.

39. A method as defined in claim 38 wherein:

said recorded dynamic annotations comprise a recorded sequence of user events and media data, in the context of a particular hypermedia document, synchronized to a time stream;

said user events comprise navigation events, mouse operations, and keystrokes made by the user; and said media data comprises at least one of an audio and video recording made by the user.

* * * * *